United States Patent [19]

Clemente

[11] Patent Number: 5,602,465
[45] Date of Patent: Feb. 11, 1997

[54] METHOD AND CIRCUIT TO IMPROVE OUTPUT VOLTAGE REGULATION AND NOISE REJECTION OF A POWER FACTOR CONTROL STAGE

[75] Inventor: Stefano Clemente, Rolling Hills Estate, Calif.

[73] Assignee: International Rectifier Corporation, El Segundo, Calif.

[21] Appl. No.: 298,429

[22] Filed: Aug. 30, 1994

[51] Int. Cl.$^6$ ........................................ G05F 5/00
[52] U.S. Cl. .................. 323/300; 323/222; 323/285; 363/80; 363/89
[58] Field of Search .................... 323/212, 217, 323/300, 222, 285; 363/36, 37, 39, 80, 81, 89

[56] References Cited

U.S. PATENT DOCUMENTS 3,409,817 11/1968 Gillett ........................................ 363/42
4,244,015 1/1981 Beebe ............................................ 363/8
4,535,399 8/1985 Szepesi ....................................... 363/41

*Primary Examiner*—Robert Nappi
*Assistant Examiner*—Shawn Riley
*Attorney, Agent, or Firm*—Ostrolenk, Faber, Gerb & Soffen, LLP

[57] ABSTRACT

A circuit for improving output voltage regulation of a power factor control stage providing power to a load. The circuit includes a voltage reference generating circuit that produces a voltage signal that is in phase lock with an input alternating current power line signal but is independent of voltage excursions of the alternating current line signal and unwanted voltage harmonics. The circuit also includes a control circuit receiving the voltage reference signal for controlling an electronic switch coupled to an input line providing power to the load. The electronic switch is pulsed on and off by the control circuit to force the current in the input line to the load to follow the reference voltage. The input alternating current line current is thus maintained in a substantially constant predetermined phase relationship with the input alternating current line voltage.

16 Claims, 3 Drawing Sheets

1

METHOD AND CIRCUIT TO IMPROVE OUTPUT VOLTAGE REGULATION AND NOISE REJECTION OF A POWER FACTOR CONTROL STAGE

BACKGROUND OF THE INVENTION

A high power factor preregulator is frequently added at the power input of power electronic equipment to improve the harmonic content of the current waveform drawn from the line. In its most common implementation, as shown in FIG. 1, the high power factor preregulator takes the form of a "boost converter" which forces the current in an inductor 10 in series with the input line 11 to follow a reference voltage 12 derived from the line voltage itself. The control circuit 14 changes the duty cycle of the switch 16, normally a power transistor, to make the current signal 18 conform to the voltage reference 12. The current signal 18 may be monitored through a suitable current transducer 20.

Thus, if the high power factor preregulator stage is working properly, the input current waveform on line 11 is a replica of the input voltage waveform on line 11. If the input voltage is a perfect sinusoid, the voltage and current waveforms on the input side of the rectifier bridge 22 will be in-phase sine waves. If the input line contains voltage harmonics, they will appear as distortion components in the current wave form.

This high power factor preregulator stage is also commonly used to preregulate the output voltage, as shown in FIG. 2. The block diagram of FIG. 2 differs from that of FIG. 1 by the fact that the reference signal 12' for the current is not taken directly from the rectified line through a voltage divider at the output of the rectifier stage (as in FIG. 1), but instead is fed through a multiplier 24 that scales the reference signal according to the deviation of the output voltage from its desired value. This is accomplished through sampling the output voltage via a voltage divider stage 26 and feeding the output reference signal 28 to an error amplifier 30, the output of which is sampled by a sample/hold stage 32 to scale the multiplication operation.

In both implementations, if the input line 11 voltage increases, so does the reference voltage 12 or 12' and consequently, the input current. It follows that the power delivered to the output load increases with the square of the input voltage. This is an undesired consequence of this control method, since the purpose of the high power factor preregulator is either to make the load appear to the line as a resistor (current proportional to voltage and in phase with it) or to supply power to a load that is relatively constant and independent of line fluctuations while improving its power factor. In this latter case, if the input voltage goes up, the input current should go down.

Ultimately, this increase in output voltage is corrected by the voltage regulation loop shown in FIG. 2 and fed by reference signal 28. However, the bandwidth of this loop is kept purposely low, below 20 Hz, to prevent the ripple present at the output (twice line frequency) from interfering with the operation of the basic current waveform control of FIG. 1 and introducing harmonic distortion.

It will be appreciated that even with a very low bandwidth, current waveshape control and output voltage regulation pose conflicting requirements on the control circuit. This conflict is normally resolved with compromises that introduce some current waveform distortion and degrade output voltage regulation somewhat.

The sample and hold technique is frequently used to reduce the distortion introduced by the voltage regulation loop. Sampling is done at the instant in which the output voltage equals its average value and the output of the sample and hold circuit changes the input to the multiplier only at the beginning of each half cycle.

Several techniques are presently in use to achieve better overall performance or eliminate this conflict altogether. The addition of a power conditioning stage at the output of the high power factor preregulator shown in FIG. 1 would, of course, provide an additional degree of control freedom, thus allowing independent control of current waveshape and output voltage. This increases cost and reduces efficiency. Short of a full power conditioning stage, more complex circuits can improve overall performance by compromising cost and efficiency.

With only one power conditioning stage, as shown in FIG. 2, to eliminate the dependence of the output power from the input voltage, a feed forward loop can be introduced, as shown in FIG. 3, that divides the error in the voltage regulation loop by the square of the input voltage. The divider stage is shown at 32 in FIG. 3 and an input voltage reference signal 35 is provided from an additional voltage divider 34 to a squaring circuit 36. The output of the squaring circuit 36 is divided into the output from the error amplifier 30 to provide the divider output which scales the multiplier 24 for the reference voltage 12 fed to the control circuit 14. This method has the limitations normally associated with a multiplicity of arithmetic blocks (multiplier, divider and squarer), for example, scaling errors, offsets and drifts. This feed forward loop can be accomplished using a type UC3854 chip available from Unitrode Corp.

This same result can be obtained by making the gain of the multiplier stage of FIG. 2 a function of the input voltage according to the law $1/V^2$. This can be done with, for example, a (component) ML4821 chip from Microlinear.

An alternative method comprises developing a signal that is proportional to the peak value of the line voltage and after suitable processing, using it to modify the voltage reference derived from the line. For example, UCS3810 from Cherry Semiconductor may be used for this purpose.

As long as a single switch is used to perform the double function of current waveshaping and output voltage regulation, the conflict between the two goals mentioned above remains, however. As a result, the bandwidth of the voltage regulation loop must remain low and line or load transients will cause large swings in output voltage. These swings can only be corrected over a few cycles of the line frequency and can be damaging to the load. Hence, some additional control circuitry is frequently added to override the normal operation of the voltage regulation loop and force immediate corrective action at the expense of input current distortion.

SUMMARY OF THE INVENTION

It is an object of the present invention to provide a method and apparatus to reduce the dependence of the output voltage on input line variations.

It is furthermore an object of the invention to improve the output voltage regulation of a power factor control stage.

It is furthermore an object of the invention to draw a sinusoidal current from the line, independently from voltage harmonics that may be present in the line itself, thereby reducing noise.

The above and other objects are achieved by a method and device for generating a voltage reference signal that is in precise lock with the input line but is independent from the voltage excursions and voltage harmonics of the line itself. The invention also provides a method and apparatus for generating a current reference waveform for a high power factor preregulator that, being rectified by electronic means, is more accurate and less distorted than if it were derived after input rectification. Additionally, the present invention provides a method of generating a voltage reference for a current signal that is in a precise and predetermined phase relationship with the line voltage thereby permitting the high power factor preregulator to draw a line current that is in phase with the line voltage or leading or lagging the line voltage by a preset phase relationship.

The invention also provides a method and device for generating a voltage reference signal in precise phase lock with the input line that is intrinsically more immune from line noise than alternative methods of voltage partition, division and filtering techniques.

The above and other objects of the invention are furthermore achieved by a method for improving output voltage regulation and noise rejection of a power factor control stage providing power to a load, comprising: generating a voltage reference signal that is in phase lock with an input alternating current power line signal but is independent of voltage excursions of the alternating current line signal; and providing the voltage reference signal to a control circuit for controlling an electronic switch coupled to an input line providing power to the load, said electronic switch being pulsed on and off by the control circuit to force the current in the input line to the load to follow the voltage reference signal, whereby the input alternating current line current is in a substantially constant predetermined phase relationship with the input alternating current line voltage.

The above and other objects of the invention are also achieved by a circuit for improving output voltage regulation and noise rejection of a power factor control stage providing power to a load comprising: a circuit for generating a voltage reference signal that is in phase lock with an input alternating current power line signal but is independent of voltage excursions of the alternating current line signal; and a control circuit receiving said voltage reference signal for controlling an electronic switch coupled to an input line providing power to the load, the electronic switch being pulsed on and off by the control circuit to force the current in the input line to the load to follow the voltage reference signal, whereby the input alternating current line current is in a substantially constant predetermined phase relationship with the input alternating current line voltage.

BRIEF DESCRIPTION OF THE DRAWINGS

The invention will be described in greater detail in the following detailed description with reference to the drawings in which.

DETAILED DESCRIPTION

Figure 4:
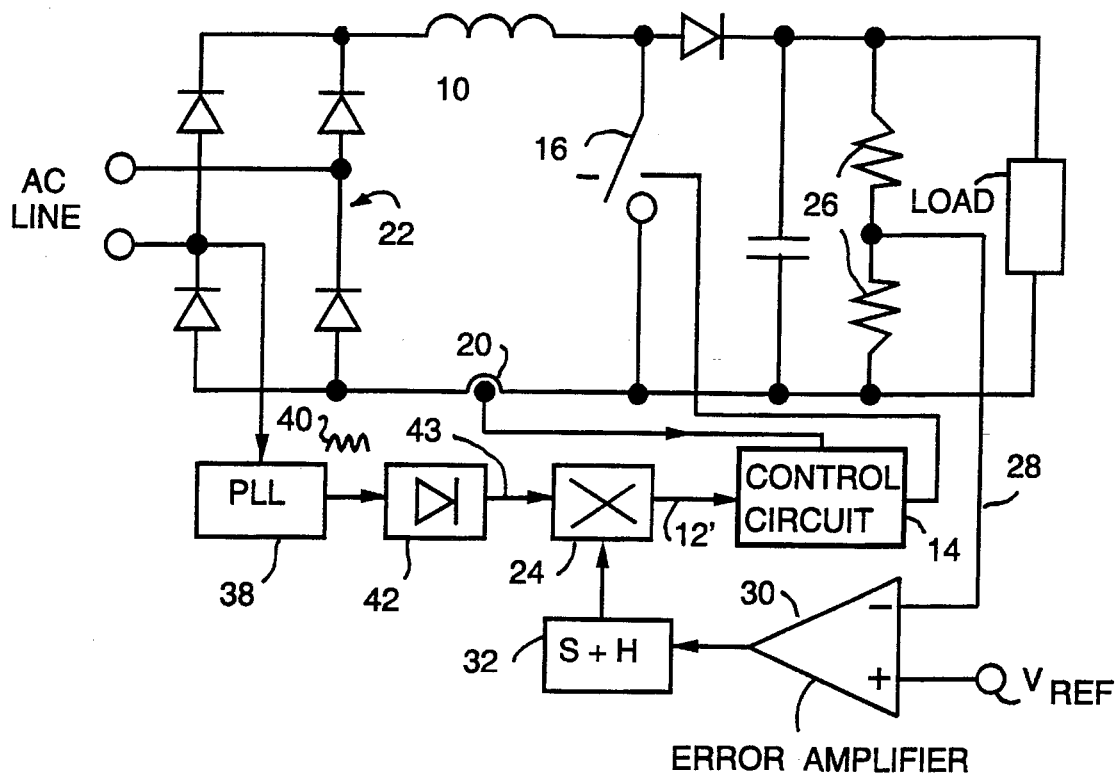
FIG. 4 shows one embodiment of a high power factor preregulator according to the invention with a phase-locked loop synchronized to the alternating current input line for generating the current controlling voltage reference signal.

Unlike the prior art methods outlined above, the invention does not use a current controlling voltage reference signal that is derived from the input line by simple voltage partition, division and filtering techniques. As shown in FIG. 4, which shows an embodiment of the invention, a reference sine wave 40 is generated by a phase-locked loop control and thus accurately synchronized with the input line. This reference sine wave 40, being internally generated, is independent from input line variations and can be kept constant with great accuracy. The synchronization can be in phase, leading or lagging, to compensate other imperfections within the control circuit or to perform more complex functions. Line synchronization itself can be performed in several ways, like voltage multiplication and squaring or with a phase-locked loop. According to a preferred implementation, a phase-locked loop is provided.

Figure 5:
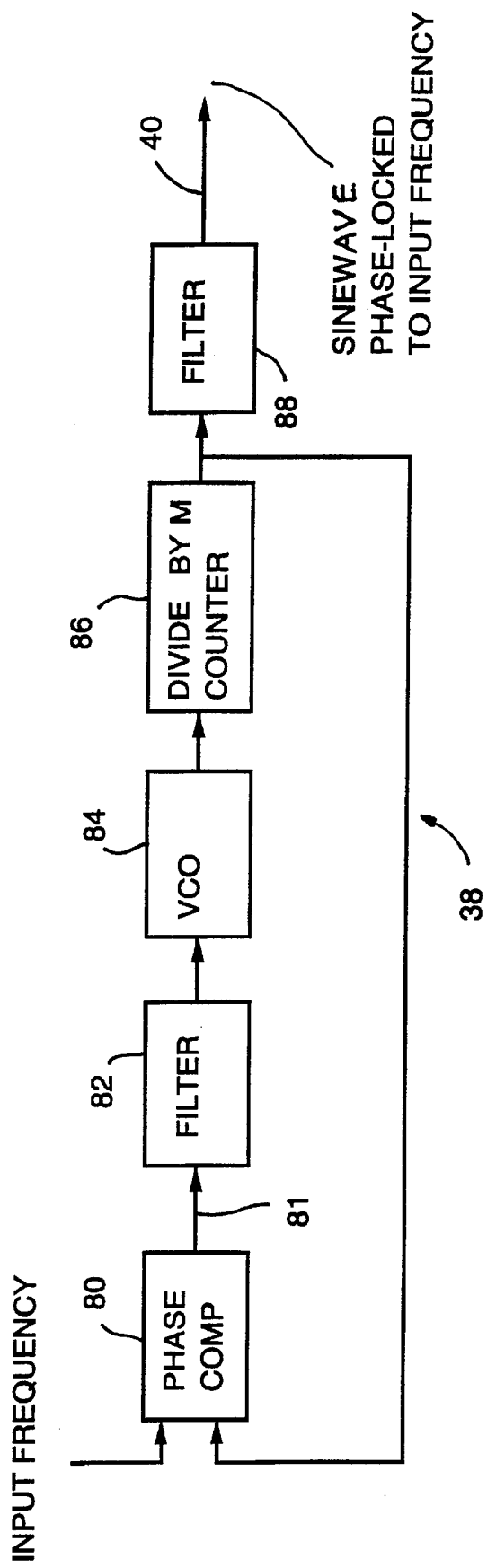
FIG. 5 shows the block diagram of a typical phase-locked loop.

FIG. 5 shows the block diagram of a typical phase-locked loop which comprises a phase comparator 80, a filter 82, a voltage controlled oscillator 84 and divide by M counter 86. The output of the counter 86 is fed to a further filter 88 and also in a feedback loop to the phase comparator 80. The output of the filter 88 is a sine wave phase-locked to the input frequency.

The voltage controlled oscillator 84 generates a signal having a frequency which is divided down by the counter 86. The phase of the output of the counter 86 is compared with that of the input frequency by the phase comparator 80. The phase error causes slight changes in the output frequency of the voltage controlled oscillator 84 that keeps the output and input waveforms in phase.

The input frequency can be derived from the line in several ways, for example, clipping of the line signal or zero crossing detection. The output of the voltage controlled oscillator 84 and divide by M counter 86 is processed by filter 88 so as to be free from harmonics and of a known and stable amplitude. Since this signal will be used to generate the voltage reference, any distortion component will be reproduced in the line current waveform. Accordingly, said distortion component must be reduced to a minimum and this is accomplished by filter 88.

Returning to FIG. 4, the signal 40 from the output of the phase-locked loop 38 is then provided to a high precision rectification stage 42 (for example, made with operational amplifiers) to maintain each half cycle as close as possible to a half cycle of an ideal sine wave of constant amplitude and frequency, synchronized with the line voltage. The rectified signal 43, after multiplication in multiplier 24, can be used as the voltage reference signal to the control circuit, as shown in FIGS. 1 and 4 and explained above.

Figure 1:
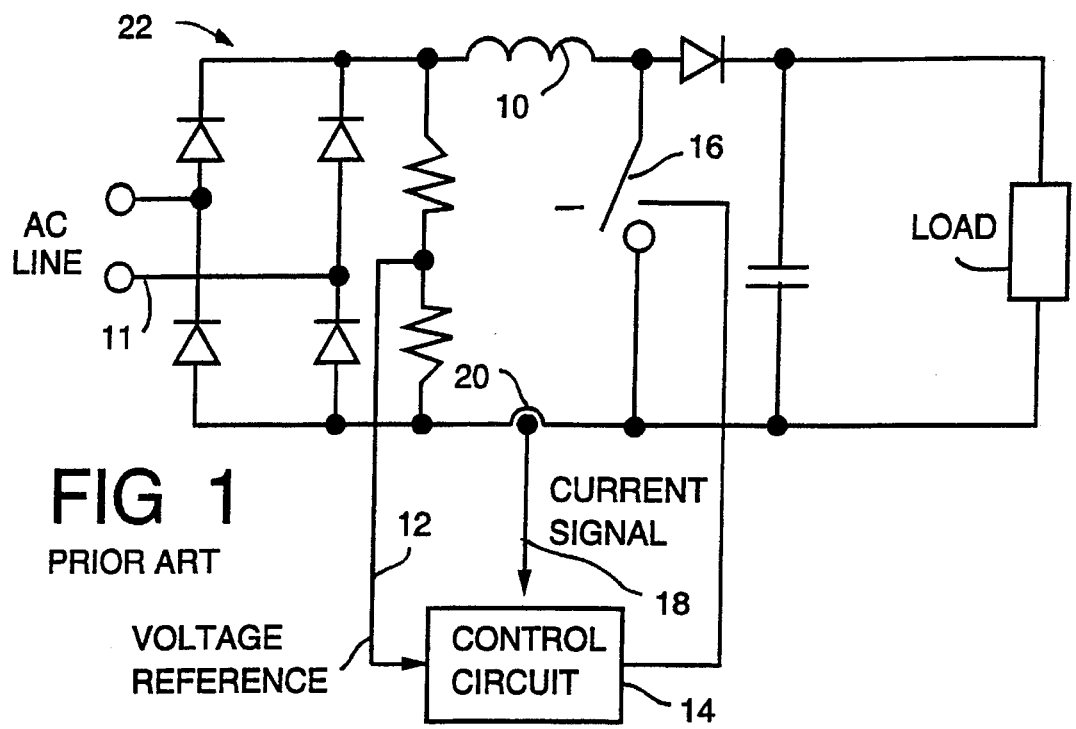
FIG. 1 shows a prior art high power factor preregulator in its basic form.
Figure 2:
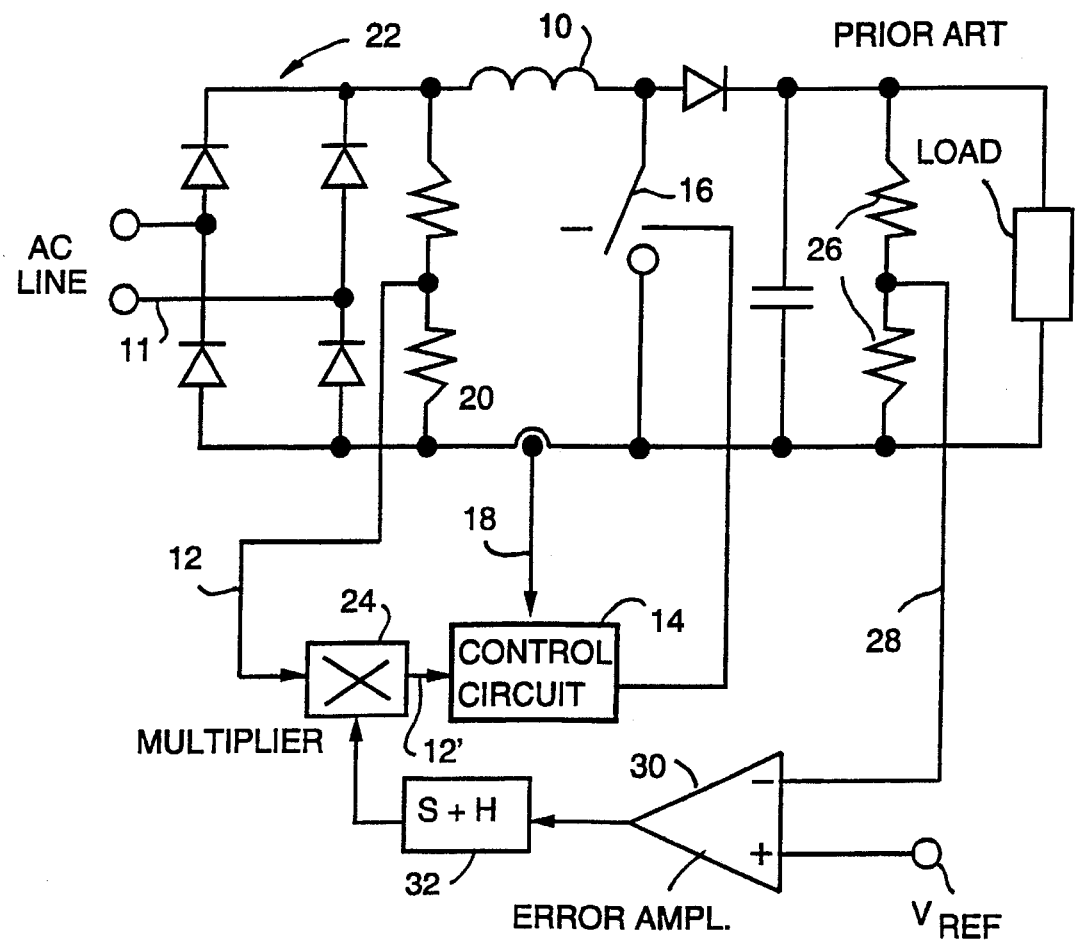
FIG. 2 shows a prior art high power factor preregulator with output voltage regulation.
Figure 3:
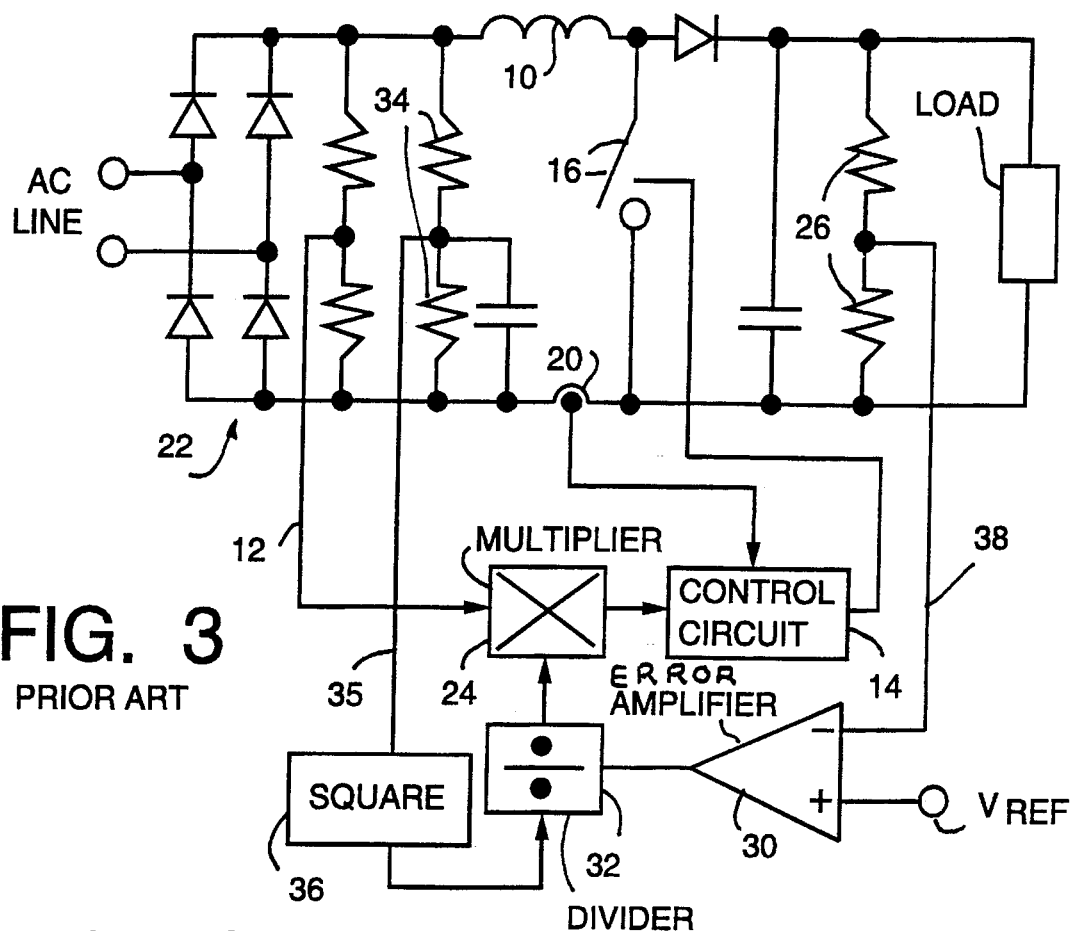
FIG. 3 shows a prior art high power factor preregulator having a feed-forward loop implemented with a squarer and divider.

Thus, in the system shown in FIG. 4, the voltage reference 12' is generated from a synthesized waveform, rather than after rectification as in the circuits of FIGS. 1–3.

As shown in FIG. 2, to reduce the distortion component of the input current caused by the voltage control loop, it is advisable to make the feed forward correction at the beginning of the cycle with a sample and hold circuit. Compared to a multi-stage filter producing a comparable amount of distortion, the sample and hold circuit gives better closed loop response because it has a much lower phase shift.

A system implemented as shown in FIG. 4 will draw a constant current from the line that is in a predetermined phase relationship with the input line voltage. As the input line voltage changes, the power delivered to the output changes proportionally, rather than with the square, as in the implementations of FIGS. 1 and 2. In so doing, it behaves like a resistive load, which is the original intent of a high power factor preregulator.

As mentioned above, there are cases where it is desirable to deliver a constant power to the output, as required by the load, and independent from the fluctuations of the input line. In these cases, the invention makes the task of the regulation loop much simpler, as it reduces the dependence of the output power from a square law to a linear one. In many cases, a simple regulation loop, as shown in FIG. 2, will be sufficient to achieve the desired regulation objectives. In FIG. 4, the simple regulation loop of FIG. 2 has been utilized to provide the desired regulation.

If a faster, more accurate response is desired, the additional methods described above, i.e., a feed forward loop as shown in FIG. 3 or the alternative multiplier stage using an ML4821 from Microlinear or the modified voltage reference derived using a CS3810 from Cherry Semiconductors can be employed. These methods would have to be simplified to take into account that the dependence of the output power is now linear with input voltage.

The invention does not compensate for load variations. The voltage regulation loop, as explained above, would take care of this, with the limitation therein explained.

Accordingly, the present invention provides a method and device for generating a voltage reference signal that is in precise lock with the input line but is independent from the voltage excursions of the line itself. It also provides a method and apparatus for generating a current reference waveform for a high power factor preregulator that, being rectified by electronic means, is more accurate and less distorted than if it were derived after input rectification.

Additionally, the present invention provides a method of generating a voltage reference for a current signal that is in a precise and predetermined phase relationship with the line voltage thereby permitting the high power factor preregulator to draw a line current that is in phase with the line voltage or leading or lagging the line voltage, as desired.

The invention also provides a method and device for generating a voltage reference signal in precise phase lock with the input line that is intrinsically more immune from line noise than alternative methods of voltage partition, division and filtering techniques.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A method for improving output voltage regulation and noise rejection of a power factor control stage providing power to a load, said method comprising:

generating a voltage reference signal that is in phase lock with an input alternating current power line signal but is independent of voltage excursions of the alternating current line signal; and providing said voltage reference signal to a control circuit for controlling an electronic switch coupled to an input line providing power to the load, said electronic switch being pulsed on and off by said control circuit to force the current in the input line providing power to the load to follow said voltage reference signal, whereby the input alternating current line current is in a substantially constant predetermined phase relationship with the input alternating current line voltage.

2. A method for improving output voltage regulation and noise rejection of a power factor control stage providing power to a load, said method comprising:

generating a voltage reference signal that is in phase lock with an input alternating current power line signal but is independent of voltage excursions of the alternating current line signal; the step of generating comprising:

producing a first signal that is in phase lock with the input alternating current line signal, rectifying the first signal to produce a second signals, and multiplying said second signal by a scaling factor to produce said voltage reference signal; and providing said voltage reference signal to a control circuit for controlling an electronic switch coupled to an input line providing power to the load, said electronic switch being pulsed on and off by said control circuit to force the current in the input line providing power to the load to follow said voltage reference signal, whereby the input alternating current line current is in a substantially constant predetermined phase relationship with the input alternating current line voltage.

3. The method recited in claim 2, wherein said step of multiplying comprises:

receiving a signal for setting the scaling factor for said step of multiplication, said signal setting the scaling factor being generated by the steps of:

sensing an output voltage across the load coupled to the power factor control stage;

comparing the sensed output voltage to a reference voltage; and providing an error signal as said signal for setting the scaling factor.

4. The method recited in claim 3, further comprising repetitively sampling said error signal for predetermined periods of time and providing a sampled signal as said signal for setting the scaling factor.

5. The method recited in claim 1, wherein said step of generating the voltage reference comprises using a phase-locked loop circuit.

6. The method recited in claim 1, wherein said step of generating the voltage reference signal comprises generating said voltage reference signal from an alternating current signal derived from the alternating current line prior to rectification.

7. The method recited in claim 2, wherein said step of producing a first signal comprises using a phase-locked loop circuit and said step of rectifying comprises using a precision rectifier stage.

8. The method recited in claim 1, wherein the predetermined phase relationship of the line current to the line voltage is one of in-phase, leading or lagging.

9. A circuit for improving output voltage regulation and noise rejection of a power factor control stage providing power to a load comprising:

a circuit for generating a voltage reference signal that is in phase lock with an input alternating current power line signal but is independent of voltage excursions of the alternating current line signal; and a control circuit receiving said voltage reference signal for controlling an electronic switch coupled to an input line providing power to the load, said electronic switch being pulsed on and off by said control circuit to force the current in the input line providing power to the load to follow said voltage reference signal, whereby the input alternating current line current is in a substantially constant predetermined phase relationship with the input alternating current line voltage.

10. A circuit for improving output voltage regulation and noise rejection of a power factor control stage providing power to a load comprising:

a circuit for generating a voltage reference signal that is in phase lock with an input alternating current power line signal but is independent of voltage excursions of the alternating current line signal; the circuit for generating a voltage reference signal comprising:

a phase-locking circuit for producing a first signal that is in phase lock with the input alternating current line signal, a rectifier for rectifying the first signal to produce a second signal, and a multiplier for multiplying said second signal by a scaling factor to produce said voltage reference signal; and a control circuit receiving said voltage reference signal for controlling an electronic switch coupled to an input line providing power to the load, said electronic switch being pulsed on and off by said control circuit to force the current in the input line providing power to the load to follow said voltage reference signal, whereby the input alternating current line current is in a substantially constant predetermined phase relationship with the input alternating current line voltage.

11. The circuit recited in claim 10, wherein said multiplier comprises:

a multiplier having an input receiving a signal for setting the scaling factor of said multiplier, said signal setting the scaling factor being generated by a circuit comprising:

a sensor sensing an output voltage across the load coupled to the power factor control stage;

a comparator for comparing the output voltage to a reference voltage and providing an error signal to said multiplier as said signal for setting the scaling factor.

12. The circuit recited in claim 11, further comprising a sample and hold circuit coupled to the output of said comparator for repetitively sampling said error signal for predetermined periods of time, the output of said sample and hold circuit comprising a sampled signal coupled to said multiplier for setting the scaling factor.

13. The circuit recited in claim 9, wherein said circuit for generating the voltage reference comprises a phase-locked loop circuit.

14. The circuit recited in claim 9, wherein said circuit for generating the voltage reference signal receives an alternating current signal derived from the alternating current line prior to rectification.

15. The circuit recited in claim 10, wherein said phase-locking circuit comprises a phase-locked loop and said rectifier comprises a precision rectifier stage.

16. The circuit recited in claim 9, wherein the predetermined phase relationship of the line current to the line voltage is one of in-phase, leading or lagging.

* * * * *